US012584417B2

(12) United States Patent
Ostermeir

(10) Patent No.: US 12,584,417 B2
(45) Date of Patent: Mar. 24, 2026

(54) SEALING ARRANGEMENT FOR A TURBOMACHINE, SEAL CARRIER ELEMENT FOR THE SEALING ARRANGEMENT, GUIDE BLADE ELEMENT, AND TURBOMACHINE

(71) Applicant: MTU Aero Engines AG, Munich (DE)

(72) Inventor: Oskar Ostermeir, Kottgeisering (DE)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 19/201,295

(22) Filed: May 7, 2025

(65) Prior Publication Data

US 2025/0264032 A1 Aug. 21, 2025

(30) Foreign Application Priority Data

May 8, 2024 (DE) ........................ 102024112887.9

(51) Int. Cl.
*F01D 11/00* (2006.01)

(52) U.S. Cl.
CPC ...... *F01D 11/003* (2013.01); *F05D 2220/323* (2013.01); *F05D 2240/59* (2013.01); *F05D 2300/611* (2013.01)

(58) Field of Classification Search
CPC ........ F01D 9/042; F01D 11/001; F01D 9/065; F01D 11/08; F01D 25/246; F01D 5/189; F01D 9/04; F01D 25/28; F01D 25/04; F01D 11/003; F01D 11/005; F01D 11/025; F01D 11/04; F01D 17/162; F01D 25/24; F01D 25/243; F01D 5/06; F01D 5/088; F05D 2260/31; F05D 2260/30; F05D 2240/11; F05D 2220/323; F05D 2240/12;
(Continued)

(56) References Cited

U.S. PATENT DOCUMENTS 4,856,963 A 8/1989 Klapproth et al.
5,746,574 A * 5/1998 Czachor ................ F01D 25/243 415/176
(Continued)

FOREIGN PATENT DOCUMENTS

DE 69606392 T2 9/2000
DE 103 20450 A1 11/2004
(Continued)

*Primary Examiner* — Eric J Zamora Alvarez
(74) *Attorney, Agent, or Firm* — Davidson Kappel LLC

(57) ABSTRACT

A sealing arrangement for a turbomachine, including a seal carrier element, an integral annular body element, and at least three protrusions. Guide blade element includes an opening that points radially inwardly for accommodating a protrusion of seal carrier element for spoke centering, and a radially inwardly extending sealing web. In the operating state, when there is sealing contact, each protrusion is accommodated in respective opening so that it is movable in axial direction A. Either seal carrier element includes a seal carrier web that extends in circumferential direction, with a sealing surface that points toward sealing web and that is offset in the axial direction, or sealing web of guide blade element extending in circumferential direction includes a sealing surface that points toward seal carrier web, and that is offset relative to an axial rear face of opening.

13 Claims, 5 Drawing Sheets

(58) Field of Classification Search
CPC ............. F05D 2240/59; F05D 2240/55; F05D 2300/611; F02C 7/28; F04D 29/563
See application file for complete search history.

(56) References Cited

U.S. PATENT DOCUMENTS

| | | | | |
|---|---|---|---|---|
| 6,267,553 | B1 * | 7/2001 | Burge | F01D 5/06 416/198 A |
| 6,901,821 | B2 | 6/2005 | Torrance et al. | |
| 7,172,199 | B2 | 2/2007 | Rogers | |
| 7,516,962 | B2 | 4/2009 | Boeck et al. | |
| 8,500,394 | B2 | 8/2013 | Major et al. | |
| 10,612,399 | B2 | 4/2020 | Freeman et al. | |
| 10,808,560 | B2 | 10/2020 | Sippel et al. | |
| 11,499,437 | B2 * | 11/2022 | Schmidt-Petersen | F01D 25/246 |
| 2014/0227080 | A1 | 8/2014 | Stiehler et al. | |
| 2015/0010385 | A1 | 1/2015 | Oyarbide et al. | |
| 2019/0368360 | A1 | 12/2019 | Freeman et al. | |
| 2019/0390558 | A1 | 12/2019 | Sippel et al. | |

FOREIGN PATENT DOCUMENTS

| | | | |
|---|---|---|---|
| EP | 2824282 | A1 | 1/2015 |
| EP | 3121379 | A1 | 1/2017 |
| WO | WO9628642 | | 9/1996 |

* cited by examiner

SEALING ARRANGEMENT FOR A TURBOMACHINE, SEAL CARRIER ELEMENT FOR THE SEALING ARRANGEMENT, GUIDE BLADE ELEMENT, AND TURBOMACHINE

This claims priority to German Patent Application DE 102024112887.9, filed on May 8, 2024 which is hereby incorporated by reference herein.

The present invention relates to a sealing arrangement for a turbomachine.

BACKGROUND

For optimizing the efficiency of turbomachines, for example gas turbines, it is particularly meaningful to minimize leakage flows between a rotating rotor and the stationary sealing arrangement. In particular, a leakage gap between radially inner stationary guide blades, in other words, situated in the area between interior ends in the radial direction of the sealing arrangement and the rotating rotor, is sealed. The seal component is secured to the guide blade element via a sliding block that is fastened to the element by a rivet or bolt, for example, and thus fixed in place. A seal component for sealing the leakage gap between the radially inner ends of the stationary guide blades and the rotating rotor may also be referred to as an "inner air seal."

SUMMARY OF THE INVENTION

An object of the present invention is to provide a sealing arrangement, a seal carrier element, and a turbomachine of the type mentioned at the outset that have a particularly low weight and that can be manufactured with little complexity.

The present invention provides a sealing arrangement, a seal carrier element, a guide blade element and by a turbomachine. Advantageous embodiments with practical refinements of the present invention are set forth in the respective subclaims.

A first aspect of the present invention relates to a sealing arrangement for a turbomachine, including a seal carrier element and a guide blade element. The seal carrier element includes an inlet coating at a radially inner end, an integral annular body element, and at least three protrusions for spoke centering of the seal carrier element radially within guide blade elements. The guide blade elements include at least three respective openings for the at least three protrusions, and the spoke centering is achieved via radial guiding of the at least three protrusions in the at least three openings, each protrusion of the at least three protrusions, in each case in the axial direction, having a front face in the flow direction and a rear face in the flow direction.

The guide blade element includes the opening, which points radially inwardly, for accommodating one protrusion of the at least three protrusions of the seal carrier element for the spoke centering. In addition, the guide blade element includes a radially inwardly extending sealing web that forms a radially innermost section of the guide blade element.

In the operating state, i.e., when a sealing contact exists between the seal carrier element and the guide blade element or between their sealing surfaces, in particular each protrusion of the at least three protrusions of the seal carrier element is accommodated in a respective opening in the guide blade element, and is thereby movable in the axial direction and/or in particular accommodated on both sides with play.

In particular, on the upstream side and the downstream side each protrusion of the at least three protrusions has axial play with respect to an axial front face or rear face of the opening, and/or in particular is axially spaced apart from these faces on the upstream side and the downstream side.

In addition, as a first alternative the seal carrier element includes a seal carrier web, extending in the circumferential direction, with a sealing surface that points toward the sealing web (of the guide blade element) and that is offset relative to the axial front faces as well as the axial rear faces of the protrusions in the axial direction, in particular downstream.

Alternatively or additionally, as a second alternative that may, but does not have to, be combined with the first alternative, the sealing web of the guide blade element extending in the circumferential direction includes a sealing surface that points toward the seal carrier web and that is offset relative to an axial rear face of the opening in the axial direction, in particular upstream.

The guide blade element may in particular be designed as an airfoil, and may be referred to as a guide blade. The seal component may be designed for sealing a leakage gap between the guide blade element and a rotor, in particular rotor blades of the rotor of the turbomachine. The seal component may also be referred to as an inner air seal or "IAS" for short. The seal component may include an inlet coating for this purpose. The inlet coating may border the leakage gap in the radial direction of the sealing arrangement. Thus, when the sealing arrangement is used as intended, the inlet coating may directly adjoin the leakage gap in the radial direction of the sealing arrangement. In addition, further elements or components, for example air baffles or flow guide elements, may be attached to the seal component.

According to the present invention, it is provided that the seal carrier element includes an annular body element and at least three protrusions that are connected to the annular body element as one part, in particular in one piece, monolithically, and/or integrally, protrude from the annular body element in the radial direction of the sealing arrangement, and in each case are inserted into at least one opening in the guide blade element. This is advantageous in particular since, due to the connection as one part between the annular body element and the at least three protrusions, particularly few individual parts are required for installing the sealing arrangement, as a result of which the sealing arrangement may be manufactured with little complexity. The seal carrier element may also be referred to as a seal carrier ring. The at least three protrusions may in particular protrude from the annular body radially, i.e., in the radial direction of the sealing arrangement. Each protrusion may also be referred to as a tab or spoke.

In one preferred design, the protrusions adjoin, in particular directly, the seal carrier web in the radial direction, and/or are connected to the seal carrier web as one part, in particular in one piece, monolithically, and/or integrally.

The protrusions and the seal carrier web may be in flush alignment, in particular essentially or partially, in the radial direction, and in particular may be in full or partial flush alignment in such a way that a radial offset corresponds at most to 1.5-fold, 1-fold, or 0.9-fold of an in particular maximum, average, or minimum axial cross-sectional dimension of the seal carrier web and/or of a protrusion.

The inner shroud element may include a plurality of openings, and may include at least one opening for each protrusion. At least three openings are thus provided. Each of the at least three openings may preferably extend through the inner shroud element. The opening may preferably also be designed as a pocket, for example as an indentation, which may extend, at least in areas, through the guide blade element, in particular through the inner shroud element, in the radial direction. An opening or pocket that extends through the guide blade element, in particular through the inner shroud element, may be produced with particularly little complexity. The opening may also be referred to as a mounting opening. Correspondingly, the pocket may also be referred to as a mounting pocket.

The protrusions and the openings in each case may be lined up, in particular lined up in a circular pattern, in the circumferential direction of the sealing arrangement. Within the scope of the present disclosure, the term "in a circular pattern" may be understood to mean that the protrusions may together form a circle, analogously to an annulus. Thus, for example, it may be provided that the seal carrier element includes 20 protrusions, for example, which are lined up in a circular pattern in the circumferential direction, each of which may be respectively inserted into one of 20 openings at the inner shroud element. Thus, in each case one of the protrusions may be respectively inserted into one of the openings.

However, it is also possible for only the minimum number of protrusions and openings to be provided, which means that three protrusions and three openings are provided. When the three protrusions of the seal carrier element are inserted into the respective openings at the inner shroud element, secure coupling and spoke centering between the seal carrier element (and thus the seal component) and the guide blade element may thus be achieved.

In the present case, a guide blade element may be a guide blade, a guide blade cluster, or a guide ring. For an individual guide blade, it is provided that an inner shroud element is attached to the radially inner end of the guide blade. In the case of a guide blade cluster, for example three to five guide blades are connected to one another by a shared inner shroud element, and are similarly connected by a radially outwardly situated element. In addition, the term "guide blade element" may also refer to an entire guide ring, which may include multiple guide blade clusters or multiple guide blades. However, the number of guide blades that are connected by a shared inner shroud element is not limited, and may assume any technically meaningful value.

According to the technology disclosed herein, the sealing arrangement includes a seal carrier element and a guide blade element. In an operating state in which the seal carrier element and the guide blade element are installed, a pressure acts on the seal carrier element, and presses the seal carrier element onto the guide blade element in such a way that a seal is formed between the seal carrier element and the guide blade element via a seal carrier web of the seal carrier element that extends in the circumferential direction, with a sealing surface that points toward the sealing web and that is offset relative to the axial front faces as well as the axial rear faces of the protrusions, upstream in the axial direction. However, in this position of the seal carrier element the protrusions in the particular opening in the guide blade element are also accommodated so that they are movable on both sides in the axial direction. This means that the protrusions are accommodated in the openings with play, and are accommodated so that they are movable or have play in the axial direction and in the flow direction (downstream), as well as opposite the flow direction (upstream). The protrusions of the seal carrier element in the openings may thus be prevented from contacting the openings in the axial direction, and an axial pressure force on the seal carrier element thus does not act on the axial front faces and axial rear faces of the protrusions or on the axial rear faces of the openings. The force acting on the seal carrier element is thus directed onto the sealing surface, which is offset relative to the axial front faces as well as the axial rear faces of the protrusions in the axial direction, in particular downstream.

Alternatively, the sealing web of the guide blade element that extends in the circumferential direction and that includes the sealing surface pointing toward the seal carrier web may be offset relative to the axial rear face of the opening in the axial direction, in particular upstream. Thus, in this case as well the seal carrier element may be prevented from contacting the guide blade element with the protrusions, and a pressure force on the seal carrier element acts on the sealing surfaces.

The present invention encompasses further advantageous embodiments that are described below.

According to a further advantageous embodiment, it is provided that in the sealing arrangement, within the radial guide the protrusions are guided axially and/or in the circumferential direction with play, in particular axial play in the axial direction being greater than play in the circumferential direction. In other words, the protrusions may be radially guided within the openings, and are guided with play in the axial direction or in the circumferential direction, i.e., are movably radially guided in the axial direction or in the circumferential direction, in particular play in the axial direction being greater than play in the circumferential direction. It may thus be ensured that an axial force on the seal carrier element acts on the sealing surfaces, and does not exert a force on the protrusions. A seal of the seal carrier element with respect to the guide blade element may thus be achieved in a preferred manner.

According to a further advantageous embodiment, it is provided that for the sealing arrangement, for one, multiple, or all guide blade elements the particular sealing web extends in the circumferential direction over the full circumferential length of the guide blade element. In other words, the sealing web extends in the circumferential direction over the full circumferential length of all guide blade elements taken together, and a particularly good sealing effect may be achieved.

According to a further advantageous embodiment, for the sealing arrangement it is provided that the protrusions in the radial guiding have sufficient axial play in the opening in the guide blade element so that during operation the seal carrier element may be pressed against the sealing web in the flow direction. In other words, a force on the seal carrier element, which is exerted by the gas flowing around or through, acts on the sealing web via the sealing surface or on the seal carrier element via the sealing surface, and the protrusions in the radial guiding have sufficiently great axial play in the opening in the guide blade element; i.e., they have a sufficiently high level of movability.

According to a further advantageous embodiment, it is provided that the protrusions in the radial guiding have axial play in the opening in the guide blade element and/or are axially spaced apart in the receptacle when the sealing surfaces are in sealing contact. In other words, the sealing surfaces of the seal carrier element or of the guide blade element lie planarly on top of one another and form a sealing contact, in this position the protrusions in the radial guiding having axial play in the opening in the guide blade element or being axially spaced apart in the opening or being movable in the guiding in the opening in the axial direction.

Particularly preferred sealing of the guide blade element with respect to the seal carrier element may be achieved in this way.

In one advantageous refinement of the present invention, at least the seal component has a design that is sliding block-free. This is advantageous, since due to the sliding block-free design the use of sliding blocks is dispensed with, thus allowing simplified installation of the sealing arrangement. It is conceivable for the at least three protrusions to include at least one wear protection layer at the inner shroud element, and additionally or alternatively at surface regions of the protrusion that face the blade element. This wear protection layer may be provided instead of the sliding blocks. Simplified installation of the sealing arrangement may also be achieved when the guide blade element also has a sliding block-free design. Particularly simple installation of the sealing arrangement may be achieved when the overall sealing arrangement has a sliding block-free design.

In a further advantageous refinement of the present invention, the at least one opening may open into at least one cavity of the at least one blade element. This is advantageous, since due to the cavity of the blade element, on the one hand weight may be saved, and on the other hand a particularly simple connection between the opening and the cavity may be established if the opening is provided as an easily produced passage through the inner shroud element. This refinement represents one possible further development of the technology described above, and may be combined with other advantageous refinements if this is technically feasible.

In a further advantageous refinement of the present invention, the at least one protrusion is spaced apart from at least one cavity base of the at least one cavity in the radial direction of the sealing arrangement. This is advantageous, since it allows particularly free, in particular collision-free, extension of the protrusion in the radial direction of the sealing arrangement, for example due to heating of the protrusion.

A second aspect of the present invention relates to a seal carrier element, in particular for a sealing arrangement according to the above description, including an inlet coating at a radially inner end, an integral annular body element, and at least three protrusions for spoke centering of the seal carrier element radially within guide blade elements, with at least three respective openings for the at least three protrusions, the seal carrier element being configured for the spoke centering to be achieved via radial guiding of the at least three protrusions in the at least three openings, each protrusion of the at least three protrusions in each case including in the axial direction a front face in the flow direction and a rear face in the flow direction, and in the operating state, when there is sealing contact between the seal carrier element and the guide blade element, each protrusion being configured to be accommodated in the opening so that it is movable in the axial direction. In particular, the seal carrier element includes a seal carrier web, extending in the circumferential direction, with a sealing surface that points toward the sealing web and that is offset relative to the axial front faces as well as the axial rear faces of the protrusions in the axial direction.

In other words, the seal carrier element includes an annular body element with at least three protrusions or spokes, with the aid of which spoke centering of the seal carrier element radially within the guide blade elements or the guide blade cluster or the guide blade ring may be achieved. Each protrusion is connected to the annular body element as one part, and protrudes from the at least one annular body element in the radial direction of the sealing arrangement. The guide blade elements include respective openings for the at least three protrusions, the protrusions being radially guided within the openings. The protrusions each include axial front faces and axial rear faces in the flow direction, and in the operating state, when there is sealing contact between the seal carrier element and the guide blade element, each protrusion is configured to be accommodated so that it is movable in the opening in the axial direction. For this purpose, the seal carrier element includes a seal carrier web that extends in the circumferential direction and that includes a sealing surface that points toward the sealing web of the guide blade element, and in the operating state, when there is sealing contact, makes full-surface planar contact with the sealing surface of the guide blade element. In order for a force on the seal carrier element to act on the sealing surface and not on the protrusions, the protrusions are radially guided within the openings in such a way that they are movable in both directions (i.e., upstream and downstream) in the axial direction. For this purpose, the front and rear faces of the protrusions are offset relative to the sealing surface in the flow direction or opposite the flow direction. Decoupling or separation between the sealing effect and the spoke centering may thus be achieved. It is thus possible to achieve a better sealing effect, which results in improved efficiency of the overall turbomachine.

According to a third aspect of the present technology, a guide blade element, in particular for a sealing arrangement according to the above description, is provided, the guide blade element including the radially inwardly pointing opening for accommodating one protrusion of the at least three protrusions of the seal carrier element for the spoke centering, and including a radially inwardly extending sealing web that forms a radially innermost section of the guide blade element. In particular, in the operating state, when there is sealing contact between the seal carrier element and the guide blade element, the opening is configured to accommodate the protrusion so that it is movable in the opening in the axial direction, and the sealing web of the guide blade element extending in the circumferential direction includes a sealing surface that points toward the seal carrier web and that is offset relative to an axial rear face of the opening in the axial direction.

In other words, the guide blade element includes radially inwardly pointing openings, an opening being provided for each protrusion of the seal carrier element. Spoke centering of the seal carrier element may be achieved via the protrusions inserted into the openings. The sealing web forms a radially innermost section of the guide blade element. The sealing web is offset upstream relative to a downstream edge of the guide opening, and the sealing web of the guide blade element includes a sealing surface that is offset relative to the axial rear face of the opening in the flow direction. In other words, in a section perpendicular to the radial direction, the opening has an approximately rectangular cross section, and a downstream face is thus formed in the axial direction, this axial rear face of the opening being offset relative to the sealing surface in the flow direction. This ensures that a force on the seal carrier element results in a force on the sealing surface, and the protrusions are movably guided in the opening in the axial direction.

A fourth aspect of the present invention relates to a turbomachine that includes at least one sealing arrangement according to the above description and at least one seal carrier element according to the above description and/or at least one guide blade element according to the above description. This turbomachine has a particularly low weight, and may be manufactured with little complexity and has a particularly great efficiency so that a particularly good seal may be achieved.

In a further advantageous embodiment of the present invention, the turbomachine is designed as an aircraft engine. This is advantageous, since due to its low weight the turbomachine is particularly suited for use as an aircraft engine.

The features presented in conjunction with the sealing arrangement according to the first aspect of the present invention and the seal carrier element according to the second aspect of the present invention and the guide blade element according to the third aspect of the present invention, as well as their advantages, similarly apply for the turbomachine according to the present invention according to the fourth aspect of the present invention, and vice versa.

Further features of the present invention result from the claims and the exemplary embodiments. The features and feature combinations mentioned above in the description as well as the features and feature combinations mentioned below in the exemplary embodiments and/or described alone may be used not only in the particular stated combination, but also in other combinations or alone without departing from the scope of the present invention. Thus, embodiments not explicitly shown or explained in the exemplary embodiments, but which follow and are producible from the described embodiments via separate feature combinations, are thus regarded as encompassed and disclosed by the present invention. In addition, embodiments and feature combinations which thus do not include all features of an originally formulated independent claim are regarded as disclosed.

DETAILED DESCRIPTION

Figure 1:
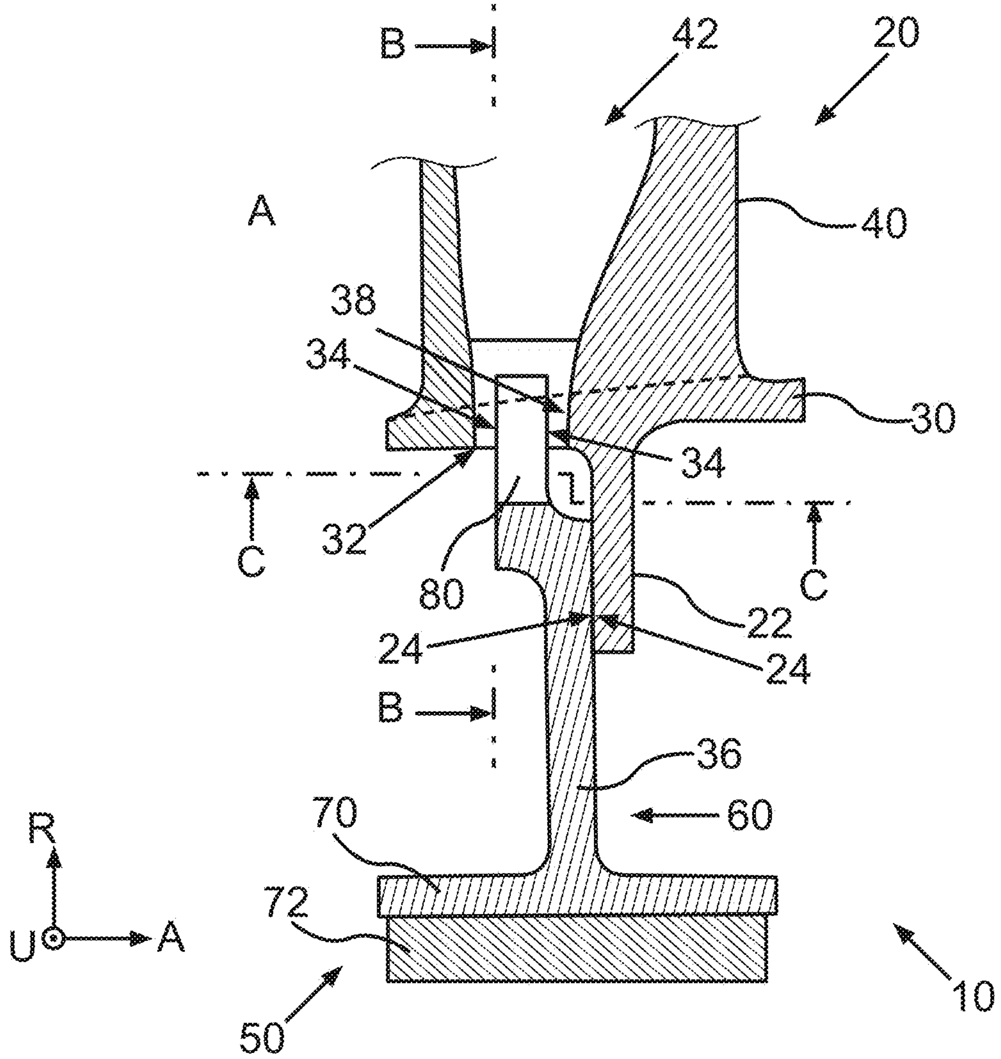
FIG. 1 shows a subarea of a sealing arrangement in a schematic sectional illustration in a viewing direction along a circumferential direction of the sealing arrangement, the sealing arrangement including a guide blade element and a seal carrier element.

FIG. 1 shows a subarea of a sealing arrangement 10 in a sectional illustration in a viewing direction along a circumferential direction U of sealing arrangement 10, sealing arrangement 10 including a guide blade element 20 and a seal component 50. Sealing arrangement 10 includes a plurality of guide blade elements 20, of which only one guide blade element 20 is shown in the figures discussed below. The respective guide blade elements 20 may together form a guide blade ring of the turbomachine, although this is not shown in FIG. 1. In the present case, individual guide blade element 20 may form a segment of the guide blade ring, and may also be referred to as a guide blade ring segment.

Guide blade element 20 includes at least one inner shroud element 30 and at least one blade element 40, in the form of a guide vane airfoil, which is connected to inner shroud element 30. The guide blade element also includes at least one seal component 50 which has a sliding block-free design, and which includes at least one seal carrier element 60 that is coupled to the at least one guide blade element 20. Seal carrier element 60 may in particular be designed as an unsegmented inner ring.

The at least one seal carrier element 60 includes at least one annular body element 70, at the inner end of which an inlet coating 72 is provided, and seal carrier element 60 also includes at least three protrusions 80 that are connected as one part to the at least one annular body element 70. Protrusions 80 protrude from the at least one annular body element 70 in the radial direction of sealing arrangement 10, and are in each case inserted into an opening 32 in guide blade element 20, it being possible for opening 32 to extend in particular through the at least one inner shroud element 30. Each of protrusions 80, which may also be referred to as tabs, is thus respectively inserted into one of openings 32. In the present case, protrusions 80 as well as openings 32 are uniformly arranged in the circumferential direction of sealing arrangement 10. Sealing arrangement 10 includes a plurality of guide blade elements 20, of which only one guide blade element 20 is shown in each case in the figures discussed below. Respective guide blade elements 20 may together form a guide blade ring of turbomachine 100, which, however, is not shown here. In the present case, individual guide blade element 20 may form a segment of the guide blade ring, and may also be referred to as a guide blade ring segment. Turbomachine 100 may be designed as an aircraft engine, and may include at least one sealing arrangement 10.

Figure 4:
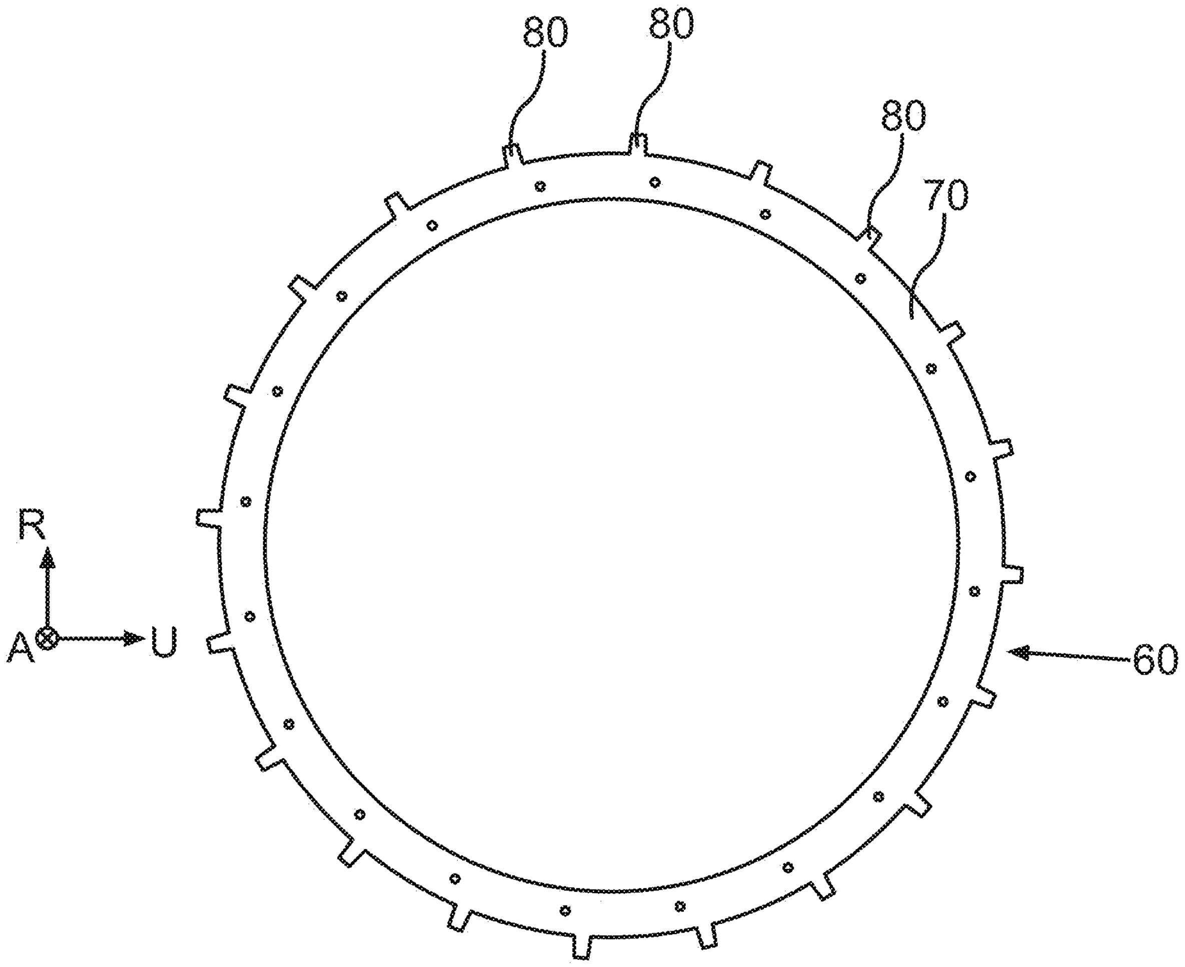
FIG. 4 shows a schematic top view of the seal carrier element in a viewing direction along the axial direction.

Protrusions 80 as well as their uniform arrangement in circumferential direction U of sealing arrangement 10 are particularly clearly apparent in FIG. 4. For example, protrusions 80 may preferably be provided with a wear protection layer. The wear protection layer may be used for the direct, low-wear support of seal carrier element 60 in the circumferential direction, for example. Further elements or components, for example air baffles or flow guide elements, may also be attached to the seal component. In addition, FIGS. 1 and 5 each show that seal component 50 includes at least one inlet coating 72 that is situated at the inner side of annular body element 70 in radial direction R. The inlet coating may allow so-called “rubbing” by a rotor, in particular run-in of a hub-side sealing fin of the rotor, and preferably may have a honeycomb structure. Radial direction R generally refers not only to sealing arrangement 10, but also to seal carrier element 60 and turbomachine 100.

Openings 32 open into respective cavities 42 of the at least one blade element 40. Each of openings 32 respectively opens into one of cavities 42. Openings 32 and cavities 42 may be formed by respective core extractions, or may be incorporated into guide blade element 20, preferably by machining.

Each of the wall areas of guide blade element 20 bordering opening 32 and each of protrusions 80 in each case provide a form fit via which relative movement between guide blade element 20 and seal component 50 in circumferential direction U is at least limited. The wall areas may preferably be provided with at least one wear protection layer. The wear protection layer may be used for the direct, low-wear support of protrusions 80 of seal carrier element 60, and thus of seal component 50 at guide blade element 20.

The at least one seal carrier element 60 may also include a seal carrier web 36. Seal carrier web 36 is connected to annular body element 70, and in axial direction A of sealing arrangement 10 is spaced apart from protrusions 80, which are lined up in circumferential direction U of sealing arrangement 10. Guide blade element 20 may also include sealing web 22, which protrudes radially inwardly from the at least one inner shroud element 30 in radial direction R of sealing arrangement 10.

Present sealing arrangement 10 allows dispensing with "inner air seals" from the prior art, in which a front flange and rear flange are laboriously manufactured (for example, by turning and grinding) and typically fastened to a sliding block using a rivet or lockbolt.

In sealing arrangement 10, protrusions 80 form an individual web at annular body element 70, the securing between guide blade element 20 and seal component 50 taking place via protrusions 80 that are inserted into respective openings 32. The use of sliding blocks, which may also be referred to as "keys," may be dispensed with in sealing arrangement 10. In addition, sealing arrangement 10 has a lower weight and may be manufactured with less machining effort than for inner air seals known from the prior art. The sealing arrangement thus has, for example, a simpler design and fewer parts, it being possible to dispense with rivets or lockbolts, for example.

FIG. 1 shows seal carrier element 60, which represents seal carrier web 36 which extends, in particular fully circumferentially, in circumferential direction U, with a sealing surface 24 that points toward sealing web 22 of the guide blade element, sealing surface 24 being offset relative to axial front faces 34 as well as axial rear faces 34 of protrusions 80 in the axial direction, in particular downstream. This means that the entire portion of seal carrier element 60 above the annular body element does not have a plate-shaped design, and instead forms an offset, the protrusions being offset relative to the sealing surface.

Figure 2:
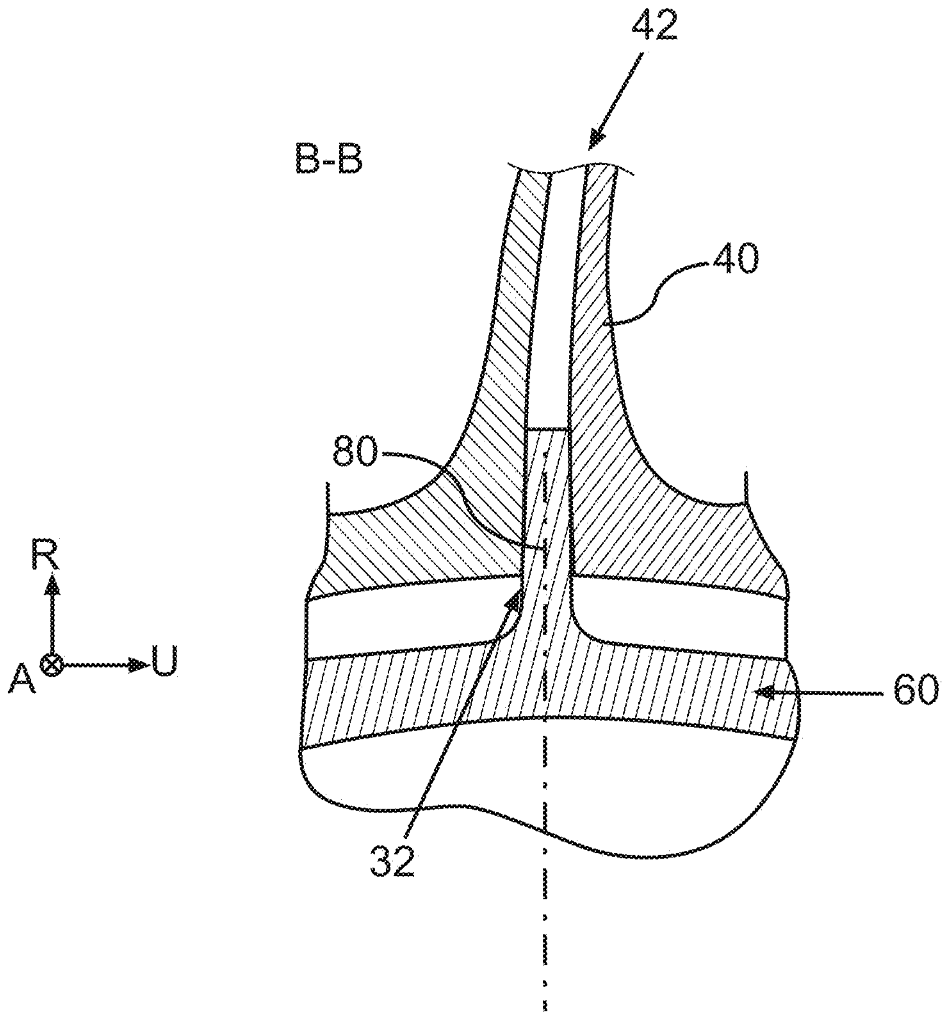
FIG. 2 shows a further sectional illustration of a segment of the sealing arrangement, depicted in enlarged scale, in a viewing direction along an axial direction of the sealing arrangement according to section B-B in FIG. 1.

FIG. 2 shows a sectional illustration along section line B-B according to FIG. 1, and in an axial direction shows a cross-sectional view of a sealing arrangement according to the technology disclosed herein. Blade element 40, which is designed with a cavity 42, includes an opening 32 that accommodates a protrusion 80 of seal carrier element 60. Protrusion 80 has a form fit with opening 32 in circumferential direction U.

Figure 3:
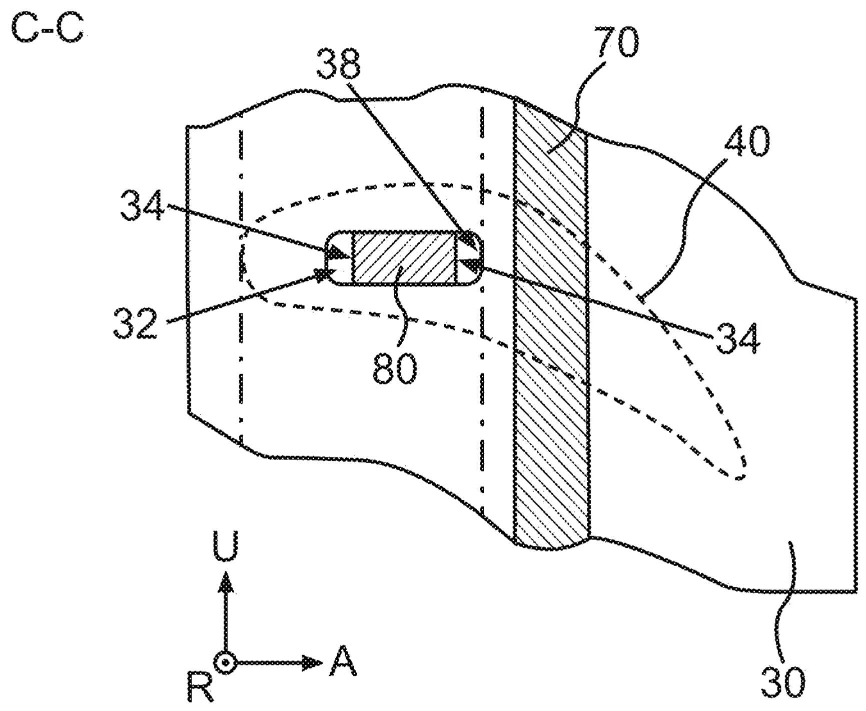
FIG. 3 shows a schematic view of an opening in the guide blade element in a viewing direction along the radial direction of the sealing arrangement according to section C-C in FIG. 1, a protrusion of the seal carrier element being inserted into the opening.

FIG. 3 shows a view of sealing arrangement 10 in radial direction R along section line C-C according to FIG. 1. It is noted that section line C-C has an offset approximately in the middle of sealing arrangement 10. FIG. 3 illustrates opening 32, which has an approximately rectangular shape in the plane situated with respect to the radial direction. A rear face of opening 32 in guide blade element 20 in the axial direction is denoted by reference numeral 38. A protrusion 80 is inserted into opening 32. Protrusion 80 has movability in the axial direction, and may thus be moved in both directions within opening 32 in the axial direction, so that protrusion 80 has play in both axial directions. Protrusion 80 is radially guided through opening 32 in circumferential direction U, and has a form fit in circumferential direction U. The protrusions in the radial guiding in opening 32 in guide blade element 20 have sufficient axial play so that during operation, when there is sealing contact in the flow direction, seal carrier element 60 may be pressed against sealing web 22. In addition, protrusions 80 have axial play in the radial guiding in opening 32 in guide blade element 20, or are axially spaced apart in opening 32 in such a way that sealing surfaces 24 may be in planar sealing contact. The at least one opening 32 opens into at least one cavity 42 of the at least one guide blade element 20. In addition, the at least one protrusion 80 may be spaced apart from at least one cavity base of the at least one cavity 42 in radial direction R of sealing arrangement 10. FIG. 3 also shows blade element 40 situated behind inner shroud element 30.

FIG. 4 shows seal carrier element 60, annular body element 70, and inlet coating 72 at its inner end. Annular body element 70 includes multiple protrusions 80 that in particular are uniformly distributed in the circumferential direction. Seal carrier element 60 may include at least three protrusions 80 for spoke centering of seal carrier element 60 radially within guide blade elements 20, with respective openings 32 for protrusions 80 via radial guiding of protrusions 80 in openings 32. Seal carrier element 60 includes a seal carrier web 36 which extends, in particular fully circumferentially, in the circumferential direction, with a sealing surface 24 (see FIG. 1) that points toward sealing web 22, and that is offset relative to axial front faces 34 as well as axial rear faces 34 of protrusions 80 in the flow direction. It is pointed out that the offset is not illustrated in FIG. 4. Separation or decoupling of the sealing effect and the spoke centering may be achieved via this offset, so that overall a better sealing effect and improved efficiency may be realized.

Figure 5:
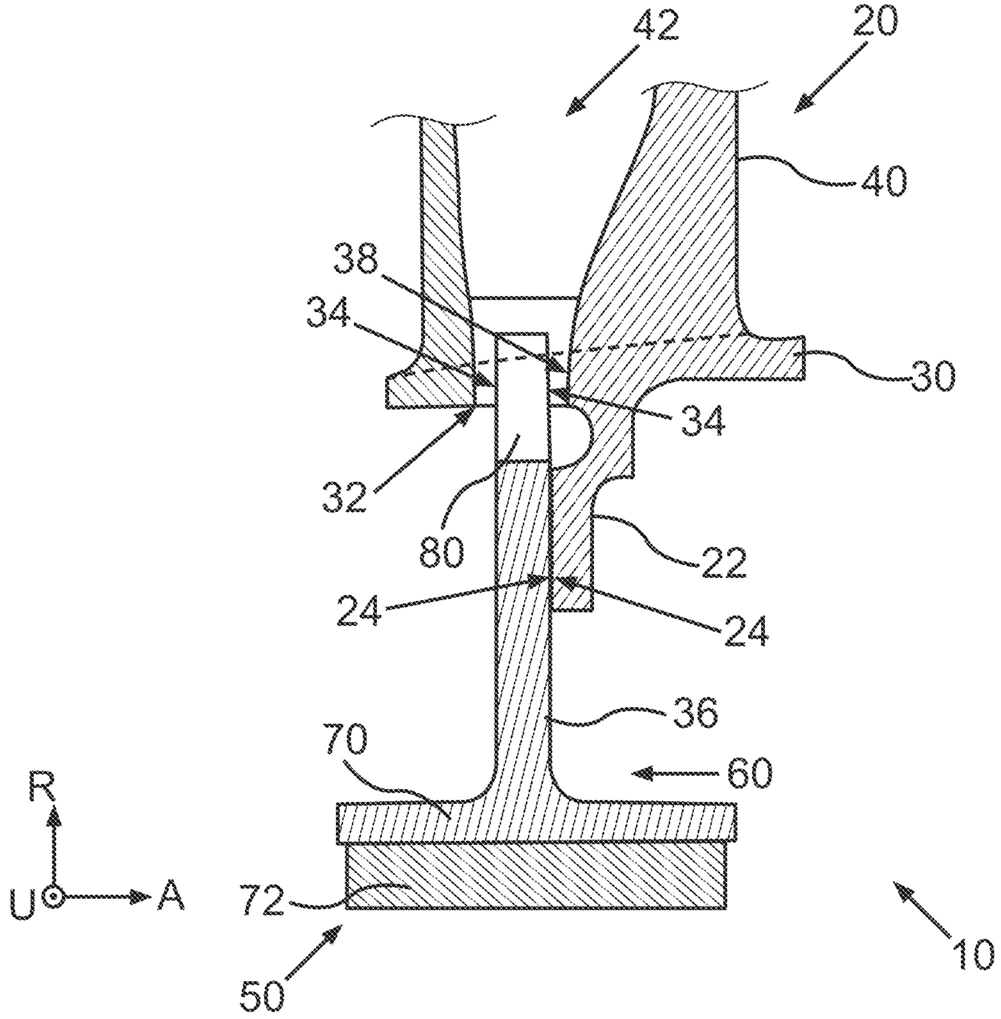
FIG. 5 shows a further schematic sectional illustration of the subarea of a sealing arrangement according to a further exemplary embodiment.

FIG. 5 shows in particular a further preferred exemplary embodiment of the technology disclosed herein. FIG. 5 illustrates a sealing arrangement 10 that includes a guide blade element 20 and a seal carrier element 60 which, when there is sealing contact in the operating state due to a pressure difference between the axial front face and the axial rear face of sealing arrangement 10, are in sealing contact, a sealing force being exerted on sealing surfaces 24. In order for the sealing force to be exerted on sealing surfaces 24, it is necessary for protrusions 80 to be movably guided in openings 32 in the axial direction. Guide blade element 20 includes a blade element 40 which in particular may have a hollow design with a cavity 42. Inner shroud element 30 is provided at the radially inwardly situated side of blade element 40. Sealing web 22 protrudes radially inwardly from inner shroud element 30, sealing web 22 being designed in such a way that sealing surface 24 has an offset relative to axial rear face 38 of opening 32 in the axial direction, in particular upstream. In addition, further elements or components, for example air baffles or flow guide elements, may be attached to seal carrier element 60.

Seal carrier element 60 may include seal carrier web 36, which according to the present exemplary embodiment has a flat or planar design. According to the present exemplary embodiment, axial rear face 34 of protrusion 80 may possibly have no offset relative to sealing surface 24. However, in the axial direction, in particular upstream, sealing surface 24 of guide blade element 20 has an offset relative to rear face 38 of opening 32 in the flow direction. In this way, a sealing force may act on sealing surfaces 24, and a better sealing effect may be achieved.

The present invention relates to a sealing arrangement 10 for a turbomachine, including a seal carrier element 60, an integral annular body element 70, and at least three protrusions 80. Guide blade element 20 includes an opening 32 that points radially inwardly for accommodating a protrusion 80 of seal carrier element 60 for spoke centering, and a radially inwardly extending sealing web 22. In the operating state, when there is sealing contact, each protrusion 80 is accommodated in respective opening 32 so that it is movable in axial direction A. Seal carrier element 60 includes a seal carrier web 36 that extends in circumferential direction U, with a sealing surface 24 that points toward sealing web 22 and that is offset in the axial direction, and/or sealing web 22 of guide blade element 20 extending in circumferential direction U includes a sealing surface 24 that points toward seal carrier web 36, and that is offset relative to an axial rear face 38 of opening 32.

LIST OF REFERENCE SYMBOLS

10 sealing arrangement
20 guide blade element
22 sealing web
24 sealing surface
30 inner shroud element
32 opening
34 face
36 seal carrier web
38 face
40 blade element
42 cavity
50 seal component
60 seal carrier element
70 annular body element
72 inlet coating
80 protrusion
100 turbomachine
A axial direction
R radial direction
U circumferential direction

What is claimed is:

1. A sealing arrangement for a turbomachine, the sealing arrangement comprising:

a seal carrier element with an inlet coating at a radially inner end;

an integral annular body element; and at least three protrusions for spoke centering of the seal carrier element radially within guide blade elements, with at least three respective openings for the at least three protrusions, the seal carrier element being configured so that the spoke centering is achieved via radial guiding of the at least three protrusions in the at least three openings, each protrusion of the at least three protrusions, in each case in an axial direction, having a front face in a flow direction and a rear face in the flow direction, the guide blade element including the opening pointing radially inwardly for accommodating one of the at least three protrusions of the seal carrier element for spoke centering, and including a radially inwardly extending sealing web forming a radially innermost section of the guide blade element, when there is sealing contact between the seal carrier element and the guide blade element, each protrusion being movably accommodated in an axial direction in the respective opening, and the seal carrier element including a seal carrier web extending in a circumferential direction, with a sealing surface pointing toward the sealing web offset relative to axial front faces as well as axial rear faces of the protrusions in the axial direction, or the sealing web extending in the circumferential direction and including a web sealing surface pointing toward the seal carrier web and offset relative to an axial rear face of the opening in the axial direction.

2. The sealing arrangement as recited in claim 1 wherein the protrusions are guided axially or in the circumferential direction in the openings with play.

3. The sealing arrangement as recited in claim 2 wherein the protrusions are guided with axial play in the axial direction being greater than play in the circumferential direction.

4. The sealing arrangement as recited in claim 1 wherein for at least one of the guide blade elements, the sealing web extends in the circumferential direction over a full circumferential length of the guide blade element.

5. The sealing arrangement as recited in claim 1 wherein the protrusions in the radial guiding have axial play in the opening in the guide blade element so that during operation, the seal carrier element may be pressed against the sealing web in the flow direction.

6. The sealing arrangement as recited in claim 1 wherein the protrusions in the radial guiding have axial play in the opening in the guide blade element or are axially spaced apart in the opening when the sealing surface and the web sealing surface are in sealing contact.

7. The sealing arrangement as recited in claim 1 wherein that the sealing arrangement has a sliding block-free design.

8. The sealing arrangement as recited in claim 1 wherein that the at least one opening opens into at least one cavity of the at least one guide blade element.

9. The sealing arrangement as recited in claim 8 wherein the at least one protrusion is spaced apart from at least one cavity base of the at least one cavity in a radial direction.

10. A turbomachine comprising the sealing arrangement as recited in claim 1.

11. The turbomachine as recited in claim 10 wherein the turbomachine is designed as an aircraft engine.

12. A seal carrier element comprising:

an inlet coating at a radially inner end;

an integral annular body element; and at least three protrusions for spoke centering of the seal carrier element radially within guide blade elements, which include at least three respective openings for the at least three protrusions, the seal carrier element being configured so that the spoke centering is achieved via radial guiding of the at least three protrusions in the at least three openings, each protrusion of the at least three protrusions, in each case in an axial direction, having a front face in a flow direction and a rear face in the flow direction, and each protrusion being configured, when there is sealing contact between the seal carrier element and the guide blade element, to be accommodated movably in the axial direction in the opening; and a seal carrier web extending in a circumferential direction and including a sealing surface pointing toward the sealing web and offset relative to the axial front faces as well as the axial rear faces of the protrusions in the axial direction.

13. A guide blade element comprising:

a radially inwardly pointing opening for accommodating one protrusion of at least three protrusions of a seal carrier element for the spoke centering, and including a radially inwardly extending sealing web forming a radially innermost section of the guide blade element, the opening is configured so that, when there is sealing contact between the seal carrier element and the guide blade element, the opening accommodates the protrusion in the opening so that the protrusion is movable in an axial direction, and the sealing web extends in a circumferential direction and includes a sealing surface pointing toward the seal carrier web offset relative to an axial rear face of the opening in the axial direction.

* * * * *